United States Patent
Chesne et al.

(10) Patent No.: US 8,466,809 B2
(45) Date of Patent: Jun. 18, 2013

(54) SYSTEM COMPRISING TWO COMBINED INSTRUMENTS MOUNTED ON BOARD AN AIRCRAFT AND METHOD IMPLEMENTING THE SYSTEM

(75) Inventors: Philippe Chesne, Vendome (FR); Yves Jaulain, Scorbe Clairvaux (FR)

(73) Assignee: Thales, Neuilly sur Seine (FR)

( * ) Notice: Subject to any disclaimer, the term of this patent is extended or adjusted under 35 U.S.C. 154(b) by 856 days.

(21) Appl. No.: 12/376,422

(22) PCT Filed: Jul. 18, 2007

(86) PCT No.: PCT/EP2007/057411
§ 371 (c)(1),
(2), (4) Date: Sep. 10, 2009

(87) PCT Pub. No.: WO2008/015102
PCT Pub. Date: Feb. 7, 2008

(65) Prior Publication Data
US 2010/0164754 A1    Jul. 1, 2010

(30) Foreign Application Priority Data

Aug. 4, 2006 (FR) ..................... 06 07172

(51) Int. Cl.
*G01C 21/00* (2006.01)
(52) U.S. Cl.
USPC ........... 340/974; 340/973; 340/977; 340/978; 701/3; 701/4
(58) Field of Classification Search
USPC ................ 340/973, 974, 945, 969, 970, 971, 340/977, 978, 980, 982; 701/3, 4, 14, 301; 70/3
See application file for complete search history.

(56) References Cited

U.S. PATENT DOCUMENTS

| 5,057,835 | A | 10/1991 | Factor et al. |
| 7,021,553 | B2* | 4/2006 | Genswein et al. ............ 237/2 A |
| 7,415,330 | B2* | 8/2008 | Saint Aroman et al. ........ 701/14 |
| 2004/0059471 | A1* | 3/2004 | Harvey et al. ..................... 701/1 |
| 2007/0286296 | A1 | 12/2007 | Chesne et al. |
| 2008/0012730 | A1* | 1/2008 | Soler ............................. 340/973 |
| 2008/0125923 | A1* | 5/2008 | Chesne et al. .................... 701/7 |
| 2008/0215927 | A1* | 9/2008 | Roussel ......................... 714/47 |

FOREIGN PATENT DOCUMENTS

| EP | 1482277 | 12/2004 |
| FR | 2868895 | 10/2005 |
| FR | 2873989 | 2/2006 |

* cited by examiner

*Primary Examiner* — Hung T. Nguyen
(74) *Attorney, Agent, or Firm* — Stroock & Stroock & Lavan LLP

(57) ABSTRACT

The invention relates to a system including two integrated electronics instruments mounted onboard an aircraft and communication links between the two integrated electronics instruments, each integrated electronics instrument including independent determination of flight parameters of the aircraft and display of either flight parameters or navigation parameters of the aircraft. The system also includes a selection module making it possible to choose, from the sensors of the two integrated electronics instruments, those retained for determining the flight parameters. Embodiments of the invention also relate to a method using the system described above. The method includes selecting from the two integrated electronics instruments the sensors retained for determination of the flight parameters according to their availability, and displaying the determined flight parameters on the display of any one or both of the integrated electronics.

10 Claims, 3 Drawing Sheets

SYSTEM COMPRISING TWO COMBINED INSTRUMENTS MOUNTED ON BOARD AN AIRCRAFT AND METHOD IMPLEMENTING THE SYSTEM

CROSS REFERENCE TO RELATED APPLICATIONS

The present application is the U.S. National Phase of International Patent Application Serial No. PCT/EP2007/057411, filed on Jul. 18, 2007, which claims the benefit of French Patent Application Serial No. 06/07172, filed on Aug. 4, 2006, both of which are hereby incorporated by reference in their entireties.

BACKGROUND

1. Field of the Invention

The invention relates to the instruments that assist in the piloting of aircraft. More specifically, it relates to the onboard instruments of aircraft whose piloting requires, for technical reasons or for regulatory reasons, the presence of standby instruments to display essential navigation data in cases where the main display systems fail.

2. Description of the Related Art

In one typical example, for a commercial aircraft carrying passengers, the instrument panel of the aircraft comprises, among others:

- a main readout for displaying, with great accuracy, a horizon, an attitude of the aircraft, and altitude, heading and speed data; this readout receives the information calculated by a computer of the aircraft from data received from various sensors;
- an integrated electronics standby instrument (well-known in English flying literature) making it possible to display flight parameters such as a horizon, an altitude and a speed and, where appropriate, some other data independently of the main system, in a more summary manner and with lower accuracy. The information displayed is calculated directly by the integrated electronics instrument that displays on one and the same color screen all the standby information. The sensors associated with the integrated electronics standby instrument, such as pressure sensors for measuring total pressure Pt and static pressure Ps of the air surrounding the aircraft and accelerometers for determining the attitude of the aircraft are normally integrated in this instrument. In the event of failure of the primary display system, the pilot uses the data from the standby instruments.

Currently, the instrument panels have only a single integrated electronics standby instrument, even when the aircraft is piloted by two pilots. The integrated electronics standby instrument is placed in the center of the instrument panel and can be used by both pilots. With the appearance of very large carrier aircraft, aircraft constructors have expressed a desire to place two integrated electronics standby instruments that can each be used by one of the two pilots.

Since each integrated electronics standby instrument comprises its own sensors, the flight parameters calculated by the two integrated electronics standby instruments are not strictly identical and their simultaneous display on both integrated electronics standby instruments could lead to confusion between the two pilots. To avoid this problem, just one of the integrated electronics standby instruments has been used to display the flight parameters, with the other integrated electronics standby instrument displaying navigation parameters such as the route to be followed and automatic piloting set-points for the aircraft. Each integrated electronics standby instrument can be configured either to display the flight parameters or to display the navigation parameters. When one of the integrated electronics standby instruments is reconfigured to display flight parameters, the other instrument is automatically reconfigured to display navigation parameters, to avoid the simultaneous display of flight parameters that could be different. The automatic reconfiguration of one of the two integrated electronics standby instruments by the adjustment of the other is obtained by means of communication between the two integrated electronics instruments that use, for example, a serial link produced by means of an electrical cable linking the two integrated electronics standby instruments. The protocol for data transfer over the serial link uses, for example, a digital data transmission standard known by the standard name ARINC (Aeronautical Radio Incorporation, located at 2251 River Road, ANNAPOLIS, MARYLAND 21401 USA).

In the current situation using two integrated electronics standby instruments, in the event of failure of the sensors of a first integrated electronics standby instrument and failure of the display of the second integrated electronics standby instrument, there is no way left to display the flight parameters whereas the information concerning the flight parameters remains available.

SUMMARY OF EMBODIMENTS OF THE INVENTION

Various embodiments of the invention aim to overcome this problem by improving the availability of the standby system.

To this end, embodiments of the invention relate to a system comprising two integrated electronics instruments mounted on board an aircraft, and means of communication between the two integrated electronics instruments, each integrated electronics instrument comprising stand-alone means of determining flight, speed, altitude and attitude parameters of the aircraft and means of displaying either flight parameters or navigation parameters of the aircraft, the independent means of determining flight parameters comprising inertial sensors and anemobarometric sensors, characterized in that it also comprises a selection module for choosing, from the sensors of the two integrated electronics instruments, those retained for determining the flight parameters.

Other embodiments of the invention relate to a method of determining flight parameters of an aircraft on a system comprising two integrated electronics instruments mounted on board the aircraft, and means of communication between the two integrated electronics instruments, each integrated electronics instrument comprising independent means of determining flight, speed, altitude and attitude parameters of the aircraft and means of displaying either flight parameters or navigation parameters of the aircraft, the independent means of determining flight parameters comprising inertial sensors and anemobarometric sensors, characterized in that it consists in selecting from the sensors of the two integrated electronics instruments, those retained to determine the flight parameters according to their availability and in displaying on the display means of any one of the integrated electronics instruments or of both the integrated electronics instruments the determined flight parameters.

The invention will be better understood and other benefits will become apparent from reading the detailed description of an embodiment given by way of example, the description being illustrated by the appended drawing in which.

In the interests of clarity, the same elements are given the same references in the different figures.

Figure 1:
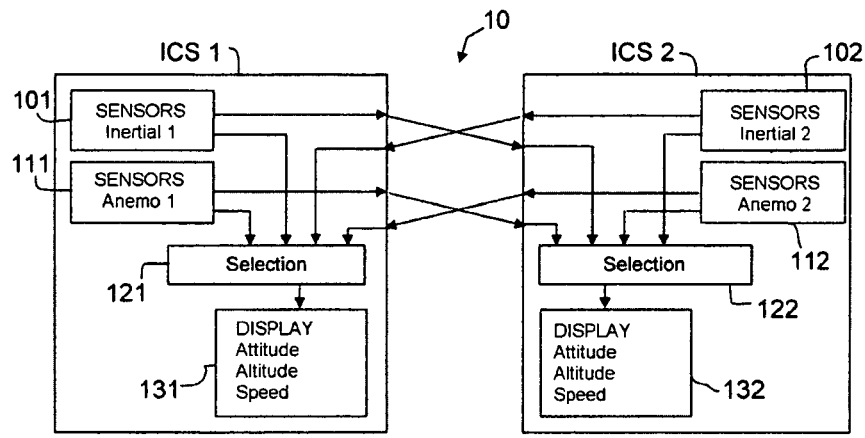
FIG. 1 represents a system comprising two integrated electronics standby instruments.

FIG. 1 represents a system comprising two integrated electronics standby instruments ICS1 and ICS2 designed to be fitted on an instrument panel of a large carrier aircraft. The system is normally used as standby by a primary system that has also been fitted in the instrument panel. It is also possible to implement the system of FIG. 1, not as a standby system, but as the primary system in smaller capacity aircraft. The instruments then by themselves ensure the redundancy of the sensors and of the display. The two instruments ICS1 and ICS2 are advantageously identical in order to improve the standardization of the aircraft equipment.

Each integrated electronics standby instrument ICS1 and ICS2 comprises inertial sensors 10$i$, $i$ representing the number of the integrated electronics standby instrument 1 or 2. The inertial sensors 101 and 102 can include accelerometers or an inertial unit. The inertial sensors 101 and 102 enable the integrated electronics instrument ICS1 or ICS2 to determine the attitude of the aircraft.

Each instrument ICS1 and ICS2 also includes anemobarometric sensors 11$i$. The anemobarometric sensors 111 and 112 are linked to pressure taps that are not represented in FIG. 1 and that are positioned on the skin of the aircraft. The pressure taps and the anemobarometric sensors 111 and 112 are used to determine the static pressure Ps and the total pressure Pt of the air surrounding the aircraft. From these pressures, the integrated electronics instrument ICS1 or ICS2 determines the altitude and the speed of the aircraft. The altitude, the speed and the attitude of the aircraft form the flight parameters of the aircraft. The inertial sensors 101 and 102 and anemobarometric sensors 111 and 112, together with an associated computer, form means of determining the flight parameters. These determination means are stand-alone because they belong to the integrated electronics standby instrument concerned and can function without external information other than that originating from the pressure taps.

Each integrated electronics standby instrument ICS1 and ICS2 comprises means of displaying either flight parameters or navigation parameters of the aircraft. The navigation parameters are information concerning the route that the aircraft must follow. Such information is received from other systems fitted in the instrument panel such as, for example, an automatic pilot of the aircraft.

The system comprises means 10 of communication between the two integrated electronics standby instruments ICS1 and ICS2 that use, for example, a serial link produced by means of an electrical conductor linking the two integrated electronics standby instruments ICS1 and ICS2. The communication means 10 enable information received from the inertial sensors 101 or 102 and anemobarometric sensors 111 or 112 of one of the two instruments ICS1 or ICS2 to be conveyed to the other instrument. Each instrument ICS1 and ICS2 comprises a selection module 12$i$ receiving the information from the sensors of the two instruments either directly or via the communication means 10. The selection module 111 chooses between the sensors of the two instruments the information needed to determine the flight parameters. More specifically, the choice is made according to the availability of the different sensors.

When equivalent sensors are available on the two integrated electronics instruments ICS1 and ICS2, the selection is made on the sensors of one predefined integrated electronics instrument. In other words, when two sensors for measuring one and the same parameter each belonging to one of the integrated electronics standby instruments ICS1 or ICS2, for example, an anemobarometric sensor for measuring the total pressure Pt of the air surrounding the aircraft, the choice of sensor is made arbitrarily by giving priority to one of the two integrated electronics standby instruments ICS1 or ICS2. If, on the other hand, one of the two sensors for measuring one and the same parameter fails, the selection module takes the information needed to determine the flight parameters from the equivalent sensor of the other integrated electronics standby instrument. In any case, two equivalent sensors are preferably never used simultaneously in the system to determine the flight parameters, in order to avoid any risk of confusion.

The system preferably determines the flight parameters only from a single series of sensors. It is thus possible to display the flight parameters simultaneously on both integrated electronics standby instruments. Once determined, the flight parameters are displayed on display means 13$i$. The display means 131 and 132 comprise, for example, a color liquid crystal screen forming the front face of the integrated electronics standby instrument concerned.

Figure 2:
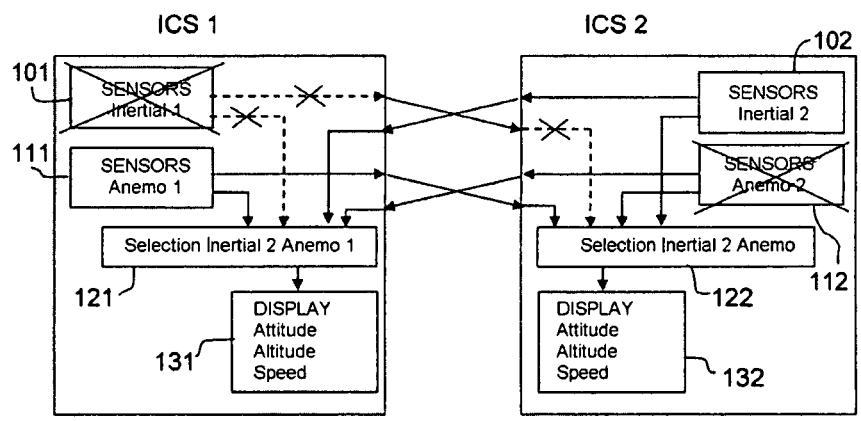
FIG. 2 represents the system of FIG. 1 in which certain sensors have failed.

FIG. 2 represents the system of FIG. 1 in which the inertial sensors 101 of the integrated electronics standby instrument ICS1 and the anemobarometric sensors 112 of the integrated electronics standby instrument ICS2 have failed. The selection module 121 or 122 of each integrated electronics standby instrument takes the information needed to determine the flight parameters from the available sensors, namely the anemobarometric sensors 111 and inertial sensors 102. Thus, the system continues to be able to determine and display the flight parameters. Without the embodiment of the invention, the two integrated electronic standby instruments taken in isolation would have been declared to have failed and neither could have displayed the flight parameters of the aircraft.

Figure 3:
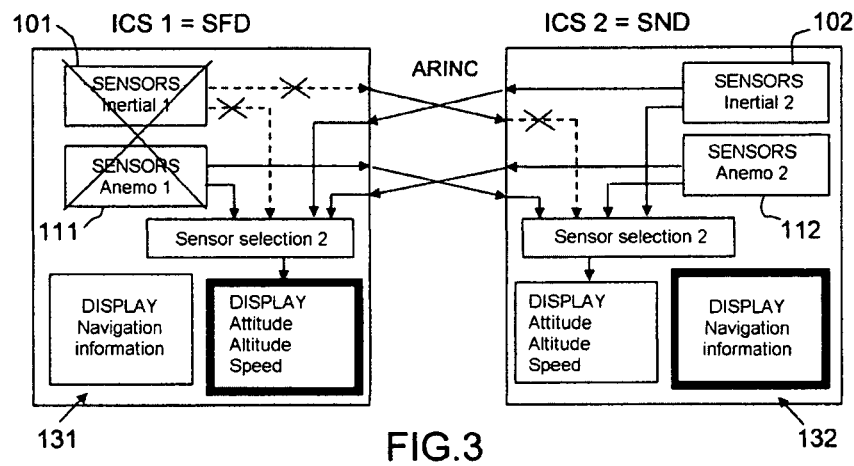
FIG. 3 represents another case of failure of sensors of the system of FIG. 1.

FIG. 3 again represents the system of FIG. 1 in which the inertial sensors 101 and the anemobarometric sensors 111 of the integrated electronics standby instrument ICS1 have failed. Here again, the system remains fully operative and the determination of the flight parameters is made from the sensors 102 and 112 of the integrated electronics standby instrument ICS2. In the absence of the embodiment of the invention, and by using two coupled integrated electronics standby instruments, the pilot used to be required to reconfigure the system to allow the flight parameters to be displayed only on the integrated electronics instrument with the sensors in an operational state, that is, the integrated electronics instrument ICS2. By implementing the invention, the two integrated electronics standby instruments ICS1 and ICS2 can continue to display flight parameters without requiring the intervention of a pilot. The integrated electronics standby instrument ICS1 then behaves as a repeater of the flight parameters determined from information delivered by the sensors 102 and 112 of the integrated electronics standby instrument ICS2.

Figure 4:
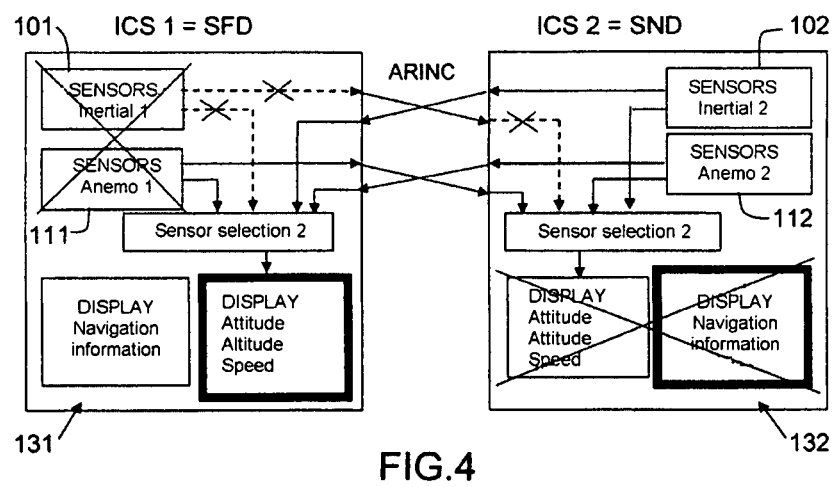
FIG. 4 represents a case of failure where sensors of one of the integrated electronics standby instruments and the readout of the other integrated electronics standby instrument have failed.

FIG. 4 represents the system of FIG. 1 in which the inertial sensors 101 and the anemobarometric sensors 111 of the integrated electronics standby instrument ICS1, and the display means 132 of the integrated electronics standby instrument ICS2 have failed. The integrated electronics standby instrument ICS2 can no longer be used by the pilot because of the failure of its display means. However, the integrated electronics standby instrument ICS1 can be configured to display the flight parameters obtained from the sensors of the integrated electronics standby instrument ICS2. In other words, on a failure of the display means of one of the integrated electronics instruments, for example ICS2, the method includes enabling the flight parameters to be displayed on the display means of the other integrated electronics instrument, in this case ICS1, regardless of the sensors selected.

Figure 5:
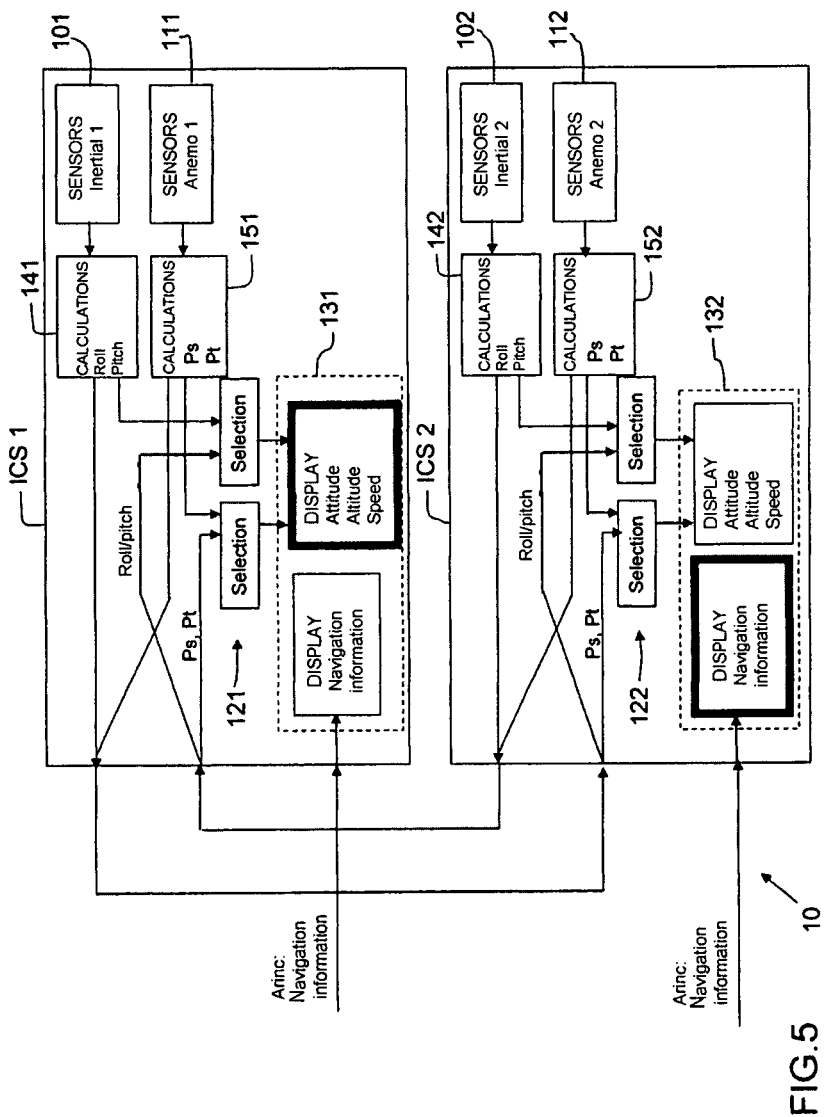
FIG. 5 represents the system of FIG. 1 in more detail.

FIG. 5 represents in more detail the system of FIG. 1. Each integrated electronics standby instrument ICS1 and ICS2 comprises a computer associated with the different sensors. More specifically, the computer of the integrated electronics standby instrument ICS1 comprises computation means 141 linked to the inertial sensor 101 and used to deteiinine the roll and pitch of the aircraft, together with computation means 151 linked to the anemobarometric sensors 111 and used to determine the static pressure Ps and the total pressure Pt of the aircraft. Similarly, the computer of the integrated electronics standby instrument ICS2 comprises computation means 142 linked to the inertial sensor 102 and used to determine the roll and pitch of the aircraft, together with computation means 152 linked to the anemobarometric sensors 112 and used to determine the static pressure Ps and the total pressure Pt of the aircraft. The selection modules 121 and 122 receive the roll, the pitch, the static and dynamic pressures determined by the different computation means 141, 142, 151 and 152. Each time two equivalent parameters, for example two roll values, are presented to the selection means 121 and 122, the selection means give priority to the choice of the parameter determined by the integrated electronics standby instrument ICS1 as long as the associated sensor or sensors is or are not declared to have failed. On a failure of a sensor, on one or other of the integrated electronics standby instruments, a label indicating the failure is transmitted by the communication means 10 to the other integrated electronics standby instrument and notably to its selection module in order for it to choose the parameter determined from the equivalent sensor of the other integrated electronics standby instrument.

Then, the selection means 121 and 122 transmit the chosen parameters to the display means, respectively 131 and 132, to generate and display the flight, attitude, altitude and speed parameters of the aircraft.

Moreover, each integrated electronics standby instrument receives, via the communication means 10, navigation parameters, notably originating from an automatic pilot of the aircraft. The navigation information can also be displayed on the display means 131 or 132. In FIG. 5, the integrated electronics standby instrument ICS1 displays the flight parameters and the integrated electronics standby instrument ICS2 displays the navigation parameters. This choice of display is symbolically represented in FIG. 5 by the bold outlined boxes. In the absence of the embodiment of the invention, each of the two integrated electronics standby instruments must display different parameters, either flight parameters or navigation parameters. Thanks to the embodiment of the invention, it becomes possible to display the flight parameters simultaneously on both integrated electronics standby instruments without risking different values between the parameters displayed on the two instruments.

The two integrated electronics standby instruments ICS1 and ICS2 each include means of adjusting the barometric pressure. These means can be operated by the pilot according to information received from a ground station concerning the local barometric pressure. The adjustment of the barometric pressure directly influences the altitude determined by the means of determining the flight parameters. Advantageously, the system includes means of exchanging the adjusted barometric pressure in order for the final adjustment made on one of the integrated electronics standby instruments ICS1 or ICS2 to be directly transmitted to the other integrated electronics standby instrument. This makes it possible to avoid making the adjustment twice.

The invention claimed is:

1. A system comprising:
    at least two integrated electronics instruments mounted onboard an aircraft;
    a communication link between the at least two integrated electronics instruments, each integrated electronics instrument comprising:
    one or more inertial sensors to sense flight parameters, wherein said flight parameters include at least one of speed, altitude and attitude parameters;
    one or more anemobarometric sensors to sense said flight parameters; and
    one or more displays displaying either flight parameters or navigation parameters of the aircraft; and
    said system further comprising one or more selection modules in communication with one or more of the inertial sensors or the anemobarometric sensors, for choosing, from the inertial sensors or the anemobarometric sensors of the at least two integrated electronics instruments, one or more sensors for determining the flight parameters.

2. The system as claimed in claim 1, wherein the at least two integrated electronics instruments are substantially identical and wherein each integrated electronics instrument further comprises said selection module.

3. The system as claimed in claim 1, wherein each integrated electronics instrument comprises an apparatus to adjust the barometric pressure, and wherein the system includes an apparatus to provide the adjusted barometric pressure from one of the integrated electronics instruments to the other integrated electronics instrument, in order to provide the last adjustment made to barometric pressure.

4. A method of determining flight parameters of an aircraft on a system, the system comprising:
    at least two integrated electronics instruments mounted onboard an aircraft;
    a communication link between the at least two integrated electronics instruments, each integrated electronics instrument comprising:
    one or more inertial sensors to sense flight parameters, wherein said flight parameters include at least one of flight, speed, altitude and attitude parameters;
    one or more anemobarometric sensors to sense said flight parameters; and
    one or more displays displaying either flight parameters or navigation parameters of the aircraft,
    wherein the method comprises the steps of:
    selecting from the inertial sensors or the anemobarometric sensors of the at least two integrated electronics instruments, one or more sensors to determine the flight parameters according to availability of the one or more sensors, to produce determined flight parameters; and
    displaying the determined flight parameters on the display of any one or both of the integrated electronics instruments.

5. The method as claimed in claim 4, wherein, when equivalent sensors are available on the at least two integrated electronics instruments, the selecting step selects the sensors of a predetermined integrated electronics instrument.

6. The method as claimed in claim 4, further comprising the step of selecting a sensor of one integrated electronics instrument upon a failure of an equivalent sensor of the other integrated electronics instrument.

7. The method as claimed in claim 4, further comprising the step of enabling display of flight parameters on the display of one integrated electronics instrument, regardless of the sensors that are selected, upon a failure of a display of the other integrated electronics instrument.

8. The system as claimed in claim 2, wherein each integrated electronics instrument comprises an apparatus to adjust the barometric pressure, and wherein the system includes an apparatus to provide the adjusted barometric pressure from one of the integrated electronics instruments to the other integrated electronics instrument, in order to provide the last adjustment made to barometric pressure.

9. The method as claimed in claim 5, further comprising the step of selecting a sensor of one integrated electronics instrument upon a failure of an equivalent sensor of the other integrated electronics instrument.

10. The method as claimed in claim 6, further comprising the step of enabling display of flight parameters on the display of one integrated electronics instrument, regardless of the sensors that are selected, upon a failure of a display of the other integrated electronics instrument.

\* \* \* \* \*